United States Patent Office 3,461,159
Patented Aug. 12, 1969

3,461,159
PROCESS FOR PREPARING ALKENE-
SULFONATES
Heinz Wendt, Kelkheim, Taunus, and Heinz Schmitz, Frankfurt am Main, Germany, assignors to Farbwerke Hoechst Aktiengesellschaft vormals Meister Lucius & Bruning, Frankfurt am Main, Germany, a corporation of Germany
No Drawing. Filed Apr. 6, 1965, Ser. No. 446,069
Claims priority, application Germany, Apr. 8, 1964,
F 42,551
Int. Cl. C07c 139/00, 139/08
U.S. Cl. 260—513       5 Claims

ABSTRACT OF THE DISCLOSURE

A process has been provided for prdoucing alkene sulfonates having 6 to 22 carbon atoms by sulfonating α-olefins with gaseous sulfur trioxide and hydrolyzing with an alkali metal hydroxide the sulfonated product by introducing it directly into an alkali metal hydroxide solution which solution contains an excess of alkali metal hydroxide at all times during the hydrolysis, the hydrolyzing solution showing an alkali reaction during hydrolysis.

It is already known that alkene-sulfonic acids and the salts thereof can be prepared by reacting olefines in organic solvents with addition products of sulfur trioxide and subjecting the intermediates obtained to hydrolysis. When starting from complex compounds of dioxane and sulfur trioxide, preferably from β- and δ-branched olefines, alkene-sulfonates are obtained, whereas from straight-chain olefines, such for example as hexene-1, alkene-sulfonates are only formed in satisfactory yields after prolonged heating of the intermediate product obtained from olefine and sulfur trioxide. If, however, straight-chain α-olefines are reacted in organic solvents with compounds obtained by addition of sulfur trioxide to organic phosphorus compounds, preferably trialkylphosphates, and the reaction is stopped by means of a strong sodium hydroxide solution, alkene-sulfonates are obtained in considerably better yields.

These processses are not practical since the preparation of the complex compound of sulfur trioxide which precedes the actual reaction is too complicated to permit industrial utilization. Moreover, the losses in complex formers and solvents incurred during these processes as well as the indispensable distillation steps make the preparation so expensive that it is not industrially attractive.

Furthermore, processes are known for reacting olefines with sulfur trioxide, which is not complex-bound, to form sulfonates. Thus, alkene-sulfonic acids are formed by reaction of propylene trimers and tetramers with sulfur trioxide in liquid sulfur dioxide and in the presence of catalytic amounts of acetic acid and by subsequent hydrolysis of the intermedate product with water. However, the reaction of α-olefines containing at least 8 carbon atoms with sulfur trioxide which is not complex-bound, (for example in sulfur dioxide as solvent and, if desired, in the presence of catalysts, and subsequent hydrolysis) does not yield alkene-sulfonates but hydroxyalkane-sulfonates. There are different methods of hydrolyzing the intermediate products obtained from sulfur trioxide and the olefines. One of them consists in adding water to the sulfonation product and subsequently boiling the solution; according to another method the intermediate is first neutralized, a hydrolyzing agent having an acid or alkaline reaction is then added to the neutral solution—alkaline compounds, such as sodium hydroxide, being preferred for the hydrolysis—and the whole is boiled.

Now we have found that by starting from α-olefines having more than 5 carbon atoms and sulfur trioxide, alkene-sulfonates are obtained by hydrolizing the intermediate products obtained by reaction of α-olefines, brought into a finely divided form by spraying, with 1.5 to 2.5 times the molar amount of gaseous sulfur trioxide by means of an aqueous solution of an alkali metal hydroxide or another compound having a strong basic reaction and by taking care that in the course of the hydrolysis an excess of the basic compound is permanently maintained.

The alkene-sulfonates prepared according to the process of the present invention are readily soluble in water and due to their good properties excellently suitable as detergents, foaming agents and wetting agents.

As α-olefines there may be used according to the process of the invention those of the general formula

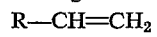

R—CH=CH$_2$ having 6 to 22, preferably more than 8, in particular 12 to 22 carbon atoms and wherein R stands for a normal or branched alkyl radical. Preference is, however, given to the use of straight-chain α-olefines which are liquid at room temperature. When using these straight-chain α-olefines, alkene-sulfonates are obtained which are distinguished by satisfactory washing, foaming and wetting properties and are easily subject to biological degradation.

The α-olefines may be used in the form of pure compounds or of the usual mixtures of varying chain length obtained in practice.

As α-olefines there may be used, for example: hexene-1, 4-methylpentene-1, octene-1, dodecene-1, tetradecene-1, pentadecene-1, hexadecene-1, octadecene-1 and docosene-1.

The sulfur trioxide is used in the gaseous state, preferably in a mixture with inert gas. Inert gas in the sense of the invention is a gas which is inert to sulfur trioxide, to the α-olefines and to the reaction products formed. Suitable inert gases are, for example, air and nitrogen. The mixture of sulfur trioxide and inert gas which is preferred is a mixture of air and sulfur trioxide.

It is important for the reaction and the quality of the products obtained that the reactants should be mixed quickly and thoroughly. In order to achieve a proper mixture of the liquid α-olefine with the mixture of sulfur trioxide and inert gas it is advisable to use, for example, an atomizing nozzle of the usual design, but any other device which enables a quick reaction of the liquid with the gas will be suitable, too.

It is desirable to react the α-olefines as completely as possible since the elimination of unreacted α-olefine left after the reaction with sulfur trioxide causes considerable technical expenses and a loss in olefine. The process of the present invention therefore provides the application of an excess of sulfur trioxide, i.e. 1.5 to 2.5 mols of sulfur trioxide per mol of α-olefine.

The reaction of the α-olefines with sulfur trioxide is an exothermic reaction. The reaction temperature should be kept as low as possible in order to avoid disturbing side reactions and excessive discoloring of the products. The upper limit for the reaction temperature varies according to the type of α-olefine used, but the reaction temperature should generally be kept below 150° C. The reaction is usually carried out at a temperature within the range from about 20° C. (room temperature) to 150° C., preferably from about 40° C. to 150° C.

According to the method of operation of the present process which is preferred, i.e. mixture of the reactants by means of an atomizing nozzle, the reaction heat is removed chiefly adiabatically by the inert gas. Consequently, the actual reaction temperature obtained depends on the quantitative ratio of inert gas to the α-olefine which has been reacted with sulfur trioxide. The fact that the reaction temperature should, in practice, not exceed 150° C. thus has an effect on the concentration of the gaseous sulfur trioxide in the inert gas (air). Mixtures having a sulfur trioxide content in the range from about 1% to about 10% by volume, preferably 1–5% by volume, are preferably used.

The reaction of sulfur trioxide with the α-olefines takes place very rapidly so that the residence time may be rather short. If the reaction products stay too long in the reaction zone this may cause undesirable phenomena, such for example as excessive discoloration of the intermediate product obtained from sulfur trioxide and the α-olefines.

When carrying out the process in practice, the following order of operation has proved particularly favorable:

The α-olefine is sprayed by means of an atomizing nozzle through the mixture of sulfur trioxide and air into the reaction zone. In a quenching zone arranged after the reaction zone the intermediate product formed from the α-olefine and sulfur trioxide which is carried along by the stream of gas mainly in the form of finely divided droplets is taken up with an aqueous solution of an alkali metal hydroxide, preferably with sodium hydroxide. Washing out of the intermediate product from the stream of gas is advantageously carried out in a packed column through which an aqueous sodium hydroxide solution is passed. It is essential for carrying out the process described that the solution formed should permanently contain an excess of sodium hydroxide and that it should still show an alkaline reaction after heating until the intermediate is completely hydrolized.

It is also possible to pump the sodium hydroxide solution several times over the packed column. For the purpose of carrying out the process in a continuous manner a constant excess of alkali is maintained by adding fresh sodium hydroxide solution and removing the corresponding amount of exhausted sodium hydroxide solution.

Heating of the solution having an alkaline reaction has to be prolonged until the intermediate obtained from α-olefine and sulfur trioxide is completely hydrolized. The hydrolysis takes 4 hours at a temperature of about 100° C. The duration of the hydrolysis can be reduced by introducing a hot solution of an alkali metal hydroxide into the quenching zone.

The hydrolyzation products having an alkaline reaction are neutralized, preferably with sulfuric acid. In order to be able to keep the amount of acid required for neutralizing as small as possible it is advantageous to react the alkali metal with the largest possible amount of the intermediate, sulfonated product, leaving a small excess of alkali metal hydroxide.

The neutralized solutions are concentrated by evaporation, preferably in a spraying column or on a drying cylinder. The dried products are obtained in the form of powders which may be used directly as detergents, foaming and wetting agents.

The products obtained contain inorganic salts, in particular sodium sulfate, but these salts show no disturbing effects when the products are used for the purpose desired and therefore need not be removed. They can, however, be eliminated by known methods, for example by treating the dry product with a 50% aqueous isopropanol solution at a temperature above 50° C. and subsequent treatment with sodium carbonate, which causes the formation of two layers. The aqueous layer contains the inorganic components and the organic layer the alkene-sulfonates. Direct extraction by means of ethanol or other solvents is also possible. The process of the present invention yields alkene-sulfonates without formation of hydroxyalkane-sulfonates which are undesirable because of their slight solubility.

The following examples serve to illustrate the invention but they are not intended to limit it thereto.

Example 1

227 grams of a mixture of liquid α-olefines having 14 to 18 carbon atoms (average molecular weight 227) are passed by means of a spraying nozzle through 2.5 m.$^3$ of dry air within one hour. The stream of air contains 160 grams of gaseous sulfur trioxide (about 2% by volume). The preliminary pressure of the air at the nozzle amounts to 1.8 atmospheres gauge pressure. After a time of stay in the reaction zone of 0.5 second the intermediate product formed by reaction of the α-olefines with sulfur trioxide is taken up by an excess of a 15% sodium hydroxide solution which runs over a packed column. The alkaline solution is then heated for 4 hours to 80–100° C. The hydrolyzation product is neutralized by means of dilute sulfuric acid and the solution concentrated to dryness. The weakly yellowish powder obtained contains 293 grams of detergent substance, of which in view of the bromine number 256 grams are sodiumalkene-sulfonate.

Example 2

224 grams of liquid hexadecene-1 are passed by means of a spraying nozzle within one hour through 2.5 m.$^3$ of dry air containing 160 grams (about 2% by volume) of gaseous sulfur trioxide, the preliminary pressure at the nozzle amounting to 1.8 atmospheres gauge pressure. The time of stay in the reaction zone amounts to 0.8 second. The intermediate product resulting from this reaction is immediately quenched with an excess of a 15% sodium hydroxide solution. The alkaline solution is heated to 90° C. for 4 hours, neutralized with dilute sulfuric acid and concentrated by evaporation. A weakly yellowish powder is obtained which contains 284 grams of detergent substance, of which in view of the bromine number 241 grams are sodium hexadecene-sulfonate.

Example 3

224 grams of liquid octene-1 are passed by means of a spraying nozzle within one hour through 5.8 m.$^3$ of dry air containing 300 grams of gaseous sulfur trioxide (1.6% by volume) the preliminary pressure at the nozzle amounting to 4.8 atmospheres gauge pressure. After a time of stay of about 0.3 second in the reaction zone which is arranged next to the nozzle the intermediate product formed from octene-1 and sulfur trioxide is taken up in an excess of a 20% sodium hydroxide solution. The alkaline solution is boiled under reflux for 4 hours, neutralized with dilute sulfuric acid and concentrated to dryness. In view of the bromine number the product obtained contains 293 grams of sodium-octene-sulfonate.

Example 4

227 grams of a mixture of liquid α-olefines having 14 to 18 carbon atoms (average molecular weight 227) are passed within one hour by means of a spraying nozzle through 2.5 m.$^3$ of air at a preliminary pressure of 2.5 atmospheres gauge pressure, the stream of air carrying along 160 grams of gaseous sulfur trioxide. The time of stay in the reaction zone amounts to about 0.5 second. The intermediate product resulting from this reaction is immediately taken up with an excess of a 15% sodium hydroxide solution of 80° C. and the temperature of the solution is maintained for 4 hours at 80° C. The alkaline solution is then neutralized by means of dilute sulfuric acid and concentrated by evaporation. The weakly yellowish powder obtained contains 290 grams of detergent substance, of which in view of the bromine number 262 grams are sodium alkene-sulfonate.

We claim:

1. In a process for producing alkene sulfonates by reacting a straight chain olefin at a temperature from 40° C. to 150° C. with gaseous sulfur trioxide in a mole ratio of 1 mole olefin:1.5 to 2.5 moles of trioxide and hydrolyzing the obtained intermediate product, the improvement consisting of introducing the intermediate product directly in a heated solution of an alkali metal hydroxide and admixing it therewith, and simultaneously neutralizing and hydrolyzing the intermediate product in the aqueous solution of the alkali metal hydroxide while heating said solution, said hydroxide being maintained in the solution in an excess at all times, the mixture showing at all times during hydrolysis an alkaline reaction.

2. A process as claimed in claim 1 wherein the sulfur trioxide is used as a mixture with an inert gas.

3. A process as claimed in claim 1 wherein the sulfonation reaction is carried out at a temperature below 150° C.

4. A process as claimed in claim 1 wherein the sulfonation reaction is carried out at a temperature within the range of from 40° C. to less than 150° C.

5. A process according to claim 1 wherein the sodium hydroxide is used as an alkaline metal hydroxide.

References Cited

UNITED STATES PATENTS

| 2,923,728 | 2/1960 | Falk et al. | 260—513 |
| 2,061,618 | 11/1936 | Downing et al. | 260—513 |
| 2,219,748 | 10/1940 | Nawiasky et al. | |
| 2,865,958 | 12/1958 | Davies et al. | 260—513 |
| 3,164,608 | 1/1965 | Blaser. | |
| 3,235,549 | 2/1966 | Broussalian | 260—513 |
| 3,255,240 | 6/1966 | Wolfram et al. | 260—513 |

FOREIGN PATENTS

| 1,185,178 | 1/1965 | Germany. |

OTHER REFERENCES

Bordwell et al., J. Am. Chem. Soc. 81, Apr. 20, 1959, pp. 1995–2000. Copy in Group 120 Library.

DANIEL D. HORWITZ, Primary Examiner